US009452796B2

(12) United States Patent
Franck et al.

(10) Patent No.: US 9,452,796 B2
(45) Date of Patent: Sep. 27, 2016

(54) SUSPENSION SYSTEM FOR A TRACKED WORK VEHICLE

(71) Applicant: CNH Industrial America LLC, New Holland, PA (US)

(72) Inventors: Randall Franck, Berne, IN (US); Brian D. Vik, Barnesville, MN (US); Daniel J. Zurn, Horace, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/391,134

(22) PCT Filed: Jun. 28, 2013

(86) PCT No.: PCT/US2013/048465
§ 371 (c)(1),
(2) Date: Oct. 7, 2014

(87) PCT Pub. No.: WO2014/022042
PCT Pub. Date: Feb. 6, 2014

(65) Prior Publication Data
US 2015/0217816 A1 Aug. 6, 2015

Related U.S. Application Data

(60) Provisional application No. 61/677,421, filed on Jul. 30, 2012.

(51) Int. Cl.
*B62D 55/15* (2006.01)
*B62D 55/108* (2006.01)
*B62D 55/104* (2006.01)
*B62D 55/14* (2006.01)
*F16F 1/387* (2006.01)

(52) U.S. Cl.
CPC ......... *B62D 55/1086* (2013.01); *B62D 55/104* (2013.01); *B62D 55/14* (2013.01); *F16F 1/3873* (2013.01)

(58) Field of Classification Search
CPC B62D 55/15; B62D 55/108; B62D 55/1083; B62D 55/1086
USPC ................................ 305/131, 142, 132, 141
See application file for complete search history.

(56) References Cited

U.S. PATENT DOCUMENTS 2,162,198 A * 6/1939 Herrington ............ B62D 55/10
16/44
2,396,848 A * 3/1946 Haushalter .............. B60C 19/08
29/525

(Continued)

*Primary Examiner* — Jeffrey J Restifo
(74) *Attorney, Agent, or Firm* — Rebecca L. Henkel

(57) ABSTRACT

A suspension system for a tracked work vehicle is provided that includes an undercarriage beam and a roller wheel beam assembly having a plurality of roller wheels and a roller wheel beam having a front clevis and a rear clevis. The suspension system also includes a front bushing mount coupled to the front clevis and a rear bushing mount coupled to the rear clevis. Moreover, the front bushing mount and the rear bushing mount are rigidly coupled to the undercarriage beam and configured to damp roll of the roller wheel beam relative to the undercarriage beam. Additionally, the suspension system includes at least one vertical mount disposed between the roller wheel beam and the undercarriage beam. Each of the at least one vertical mount is configured to provide vertical support for the roller wheel beam and to damp vertical movement of the roller wheel beam relative to the undercarriage beam.

13 Claims, 8 Drawing Sheets

(56) References Cited

U.S. PATENT DOCUMENTS

| | | | | |
|---|---|---|---|---|
| 2,779,636 A * | 1/1957 | Allen | B60G 11/225 | 305/133 |
| 3,938,606 A * | 2/1976 | Yancey | B62D 55/08 | 180/9.5 |
| 4,261,589 A * | 4/1981 | Wilkes | A47C 7/002 | 16/18 A |
| 5,273,126 A * | 12/1993 | Reed | B62D 49/0635 | 180/9.21 |
| 5,607,210 A * | 3/1997 | Brazier | B62D 55/04 | 305/131 |
| 5,842,757 A * | 12/1998 | Kelderman | B62D 55/02 | 305/125 |
| 5,899,542 A * | 5/1999 | Lykken | B62D 55/1086 | 180/9.54 |
| 5,899,543 A * | 5/1999 | Lykken | B62D 55/1086 | 180/9.54 |
| RE36,284 E * | 8/1999 | Kelderman | B62D 49/0635 | 180/9.44 |
| 5,954,148 A * | 9/1999 | Okumura | B62D 55/04 | 180/9.21 |
| 6,062,662 A * | 5/2000 | Witt | B62D 49/0635 | 305/125 |
| 6,068,353 A * | 5/2000 | Juncker | B62D 55/04 | 305/125 |
| 6,435,628 B1 * | 8/2002 | Hasselbusch | B62D 55/0847 | 305/109 |
| 7,562,727 B1 * | 7/2009 | Hoffart | B62D 55/1125 | 180/9.1 |
| 7,708,092 B2 * | 5/2010 | Despres | B62D 55/108 | 180/9.1 |
| 8,132,822 B2 * | 3/2012 | Nance | A01D 34/82 | 280/124.135 |
| 2004/0140138 A1 * | 7/2004 | Brazier | B62D 49/0635 | 180/9.21 |
| 2005/0145422 A1 * | 7/2005 | Loegering | B62D 55/084 | 180/9.26 |
| 2007/0017714 A1 * | 1/2007 | Brazier | B62D 55/04 | 180/9.3 |
| 2012/0242142 A1 * | 9/2012 | Kautsch | B62D 55/02 | 305/142 |
| 2013/0187444 A1 * | 7/2013 | Hansen | B62D 55/04 | 305/142 |
| 2014/0008134 A1 * | 1/2014 | Zuchoski | B62D 55/10 | 180/9.21 |
| 2015/0217816 A1 * | 8/2015 | Franck | B62D 55/104 | 305/142 |
| 2015/0321711 A1 * | 11/2015 | Vik | B62D 55/0842 | 305/142 |

* cited by examiner

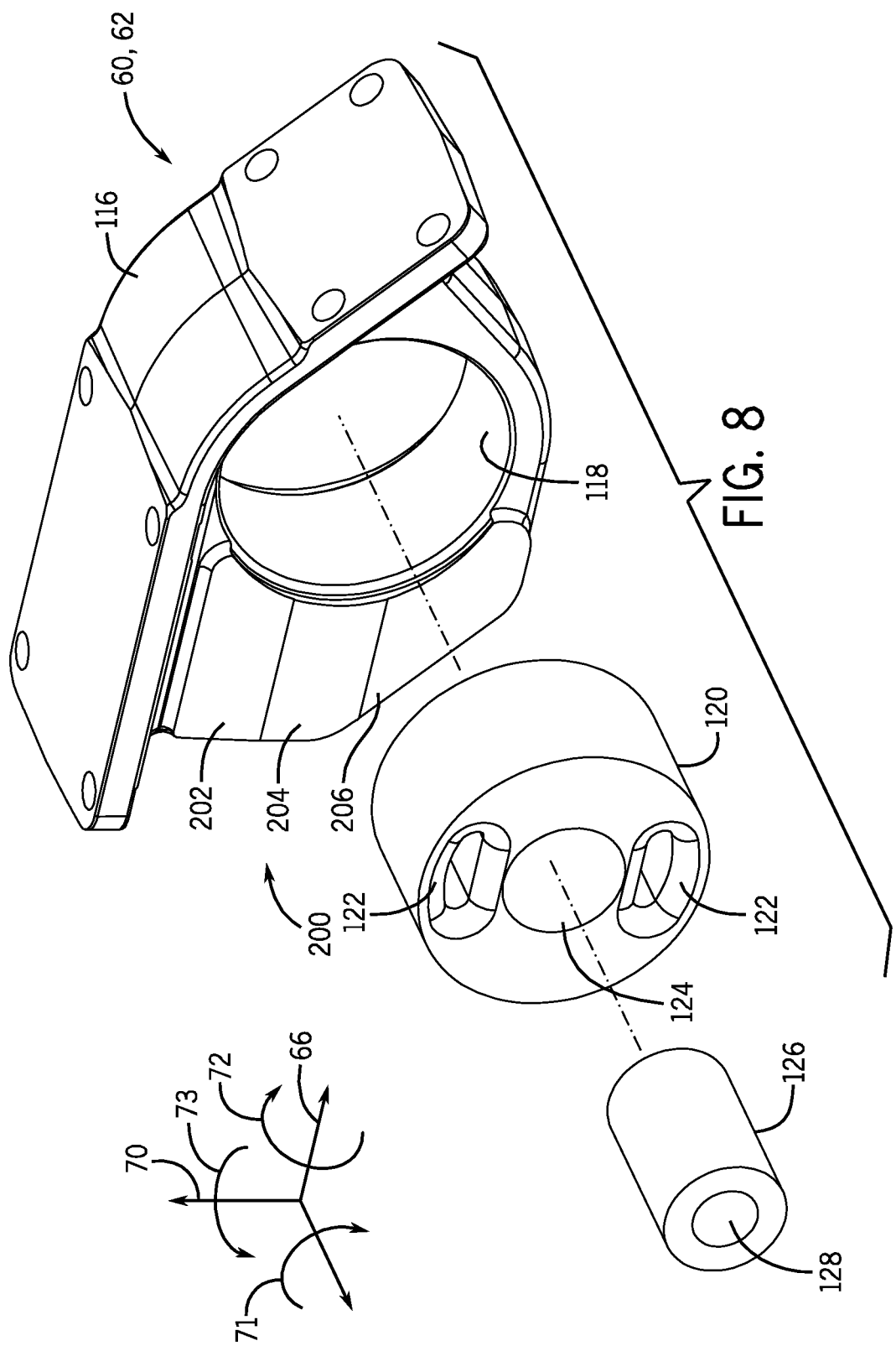

SUSPENSION SYSTEM FOR A TRACKED WORK VEHICLE

CROSS REFERENCE TO RELATED APPLICATION

This application claims priority from and the benefit of U.S. Patent Provisional Application Ser. No. 61/677,421, entitled "SUSPENSION SYSTEM FOR A TRACKED WORK VEHICLE", filed Jul. 30, 2012, which is hereby incorporated by reference in its entirety.

BACKGROUND

The present disclosure relates generally to tracked work vehicles, and more particularly, to a tracked work vehicle suspension system.

Certain work vehicles are moved on continuous tracks having a suspension system, which includes an undercarriage beam. The undercarriage beam is used to support the vehicle above load bearing wheels (e.g., roller wheels) rolling on the continuous track as the track moves. It is desirable to distribute the weight of the work vehicle on the load bearing wheels to limit damage to the continuous track due to overheating or other weight overload issues. To achieve the weight distribution across the load bearing wheels, certain embodiments of the suspension dampen rotation of the wheels (e.g., roll, yaw, pitch). However, excessive movement of the suspension system components may induce contact between elements of the suspension system and/or the work vehicle. Additionally, it is often desirable to limit the width of the suspension system to control the overall width of the vehicle. For example, if the suspension system uses a shear element to damp the movement of the wheels, and to support the vehicle, the width of the suspension system may be wider than is desirable, and/or may not provide sufficient damping of vertical motion (e.g., pitch) after extended periods of use.

BRIEF DESCRIPTION

In one embodiment, a suspension system for a tracked work vehicle includes an undercarriage beam, a roller wheel assembly, a front bushing mount, a rear bushing mount, and at least one vertical mount. Additionally, the roller wheel assembly includes a plurality of roller wheels and a roller wheel beam having a front clevis and a rear clevis. The front bushing mount is coupled to the front clevis, and the rear bushing mount is coupled to the rear clevis. The at least one vertical mount is disposed between the roller wheel beam and the undercarriage beam. Moreover, the front bushing mount and rear bushing mount are rigidly coupled to the undercarriage beam and configured to damp roll of the roller wheel beam. Furthermore, each of the at least vertical mount is configured to provide vertical support for the roller wheel beam and to damp vertical movement of the roller wheel beam.

In another embodiment, a suspension system for a tracked work vehicle includes a continuous track configured to propel the tracked work vehicle. The suspension system also includes a roller wheel beam configured to couple to roller wheels, and the roller wheel beam includes at least one clevis each having at least one arm. Additionally, the suspension system includes at least one vertical mount comprising a rubber pad, and the rubber pad is configured to damp vertical movement of the roller wheel beam. Moreover, the suspension system includes at least one bushing mount. Each of the at least one bushing mounts includes a rubber bushing configured to damp roll of the roller wheel beam by compressing during roll of the roller wheel beam. Furthermore, each of the at least one bushing mount includes a rigid frame configured to block roll of the roller wheel beam beyond a threshold angle by engaging a portion of the rigid frame against the at least one arm when roll of the roller wheel beam reaches the threshold angle.

In another embodiment, a suspension system for a work vehicle includes an undercarriage beam and a roller wheel beam, which includes a clevis having at least one arm. Additionally, the suspension system includes a bushing mount coupled between the first arm and the second arm. The bushing mount is configured to damp roll of the roller wheel beam. Moreover, the bushing mount includes a rigid frame and at least one vertical mount. The bushing mount includes at least one machined face configured to block rotation of the roller wheel beam beyond a threshold angle, a tubular bore, and a rubber bushing disposes within the tubular bore. The rubber bushing is configured to compress when the roller wheel beam rolls. Furthermore, the at least one vertical mount is disposed between the roller wheel beam and the undercarriage beam, includes a rubber pad, and is configured to support the undercarriage beam and damp vertical movement of the roller wheel beam.

DRAWINGS

These and other features, aspects, and advantages of the present invention will become better understood when the following detailed description is read with reference to the accompanying drawings in which like characters represent like parts throughout the drawings, wherein:

FIG. 8 is a flowchart of an embodiment of a method for manufacturing an undercarriage for a tracked work vehicle.

DETAILED DESCRIPTION

Figure 1:
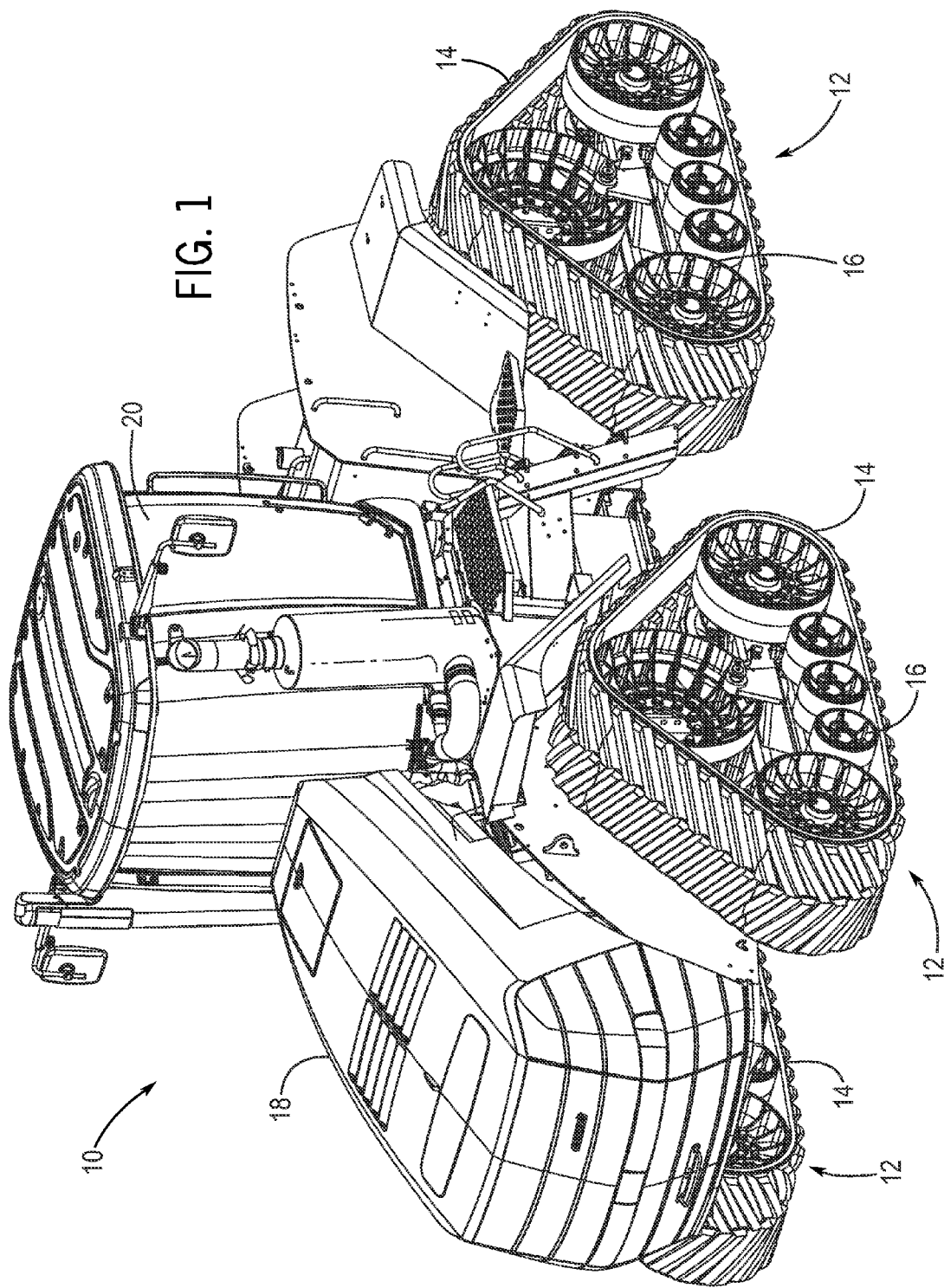
FIG. 1 is a perspective view of an embodiment of a tracked work vehicle having a suspension system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Various embodiments of the present disclosure include a suspension system configured to damp vibrations between a track and a work vehicle. As discussed below, the suspension system uses an undercarriage beam to suspend the vehicle over load bearing wheels, which are coupled to a roller wheel beam. The suspension system damps roll of the roller wheel beam to enhance contact between the continuous track and the ground, even when the work vehicle is operated on uneven terrain. In the present embodiment, the suspension system blocks roll of the roller wheel beam beyond a threshold angle to substantially reduce or eliminate the possibility of contact between various components of the suspension system/vehicle. Additionally, roll damping and limiting may be performed by bushing mounts and vertical mounts compactly placed between the arms of the roller wheel beam and the roller wheels. In certain embodiments, the roller wheel beam is compactly coupled to the bushing mounts using a pin assembly. In some embodiments, the pin assembly may not extend outwardly beyond the edges of the roller wheel beam while enabling the bushing mounts to damp roll and limit roll and/or yaw of the roller wheel beam. In other words, the pin assembly adds no additional width to the roller wheel beam and thereby does not widen the continuous track. Moreover, by using the compact arrangement, the bushing mounts enable roll control of the roller wheels and roller wheel beam without expanding the width of the suspension system. By minimizing the width of the suspension system, the pin assembly and bushing mounts enable roll control while enabling operation of the work vehicle in work spaces with narrow constraints. For example, the work vehicle with narrower tracks may be operated in a field with narrower rows of soil between vegetation without damaging the vegetation than a wider-tracked vehicle may operate. Additionally, a narrower track compacts less soil than a wider-tracked vehicle, thereby leaving the field more suitably cultivated than a field on which a wider-tracked vehicle has been operated. Accordingly, a vehicle having a narrower track and suspension system enables more efficient planting of vegetation in a field, thereby increasing efficiency of the fields in which the vehicle is operated.

Turning now to the drawings, FIG. 1 is a perspective view of an embodiment of a tracked work vehicle 10. The vehicle 10 includes a suspension system 12 used to support the vehicle 10 and to damp vibrations between the continuous track 14 and a frame of the vehicle. As will be appreciated, a narrower track may be used to operate between crop rows. As discussed below, embodiments of the work vehicle 10 with a narrow track 14 may include narrower components within the suspension system 12. The undercarriage beam 16 may be formed using casting, machining, and/or other suitable methods of forming the undercarriage beam 16. Moreover, the undercarriage beam 16 may be formed from steel, iron (e.g., ductile iron), and/or other materials suitable for formation of the undercarriage beam 16 capable of supporting the vehicle 10. Additionally, the tracked work vehicle 10 has a body 18. In certain embodiments the body 18 may enclose various components used to operate the vehicle 10. For example, in some embodiments, the body 18 may enclose an engine, a transmission, a drive train, an exhaust system, and/or another vehicle component suitable for inclusion within the vehicle 10. In other embodiments, the vehicle 10 may have some or all of the suitable vehicular components exterior to the body 18. The vehicle 10 further includes a driver compartment 20. In some embodiments, the driver compartment 20 may be fully enclosed (e.g., having glass windows all around the drive compartment 20), as illustrated. Other embodiments may include a driver compartment 20 that is open to the environment with or without a compartment roof. Furthermore, in certain embodiments, the driver compartment 20 may include steering controls, a seat apparatus, temperature controls, and/or other suitable driver controls.

Figure 2:
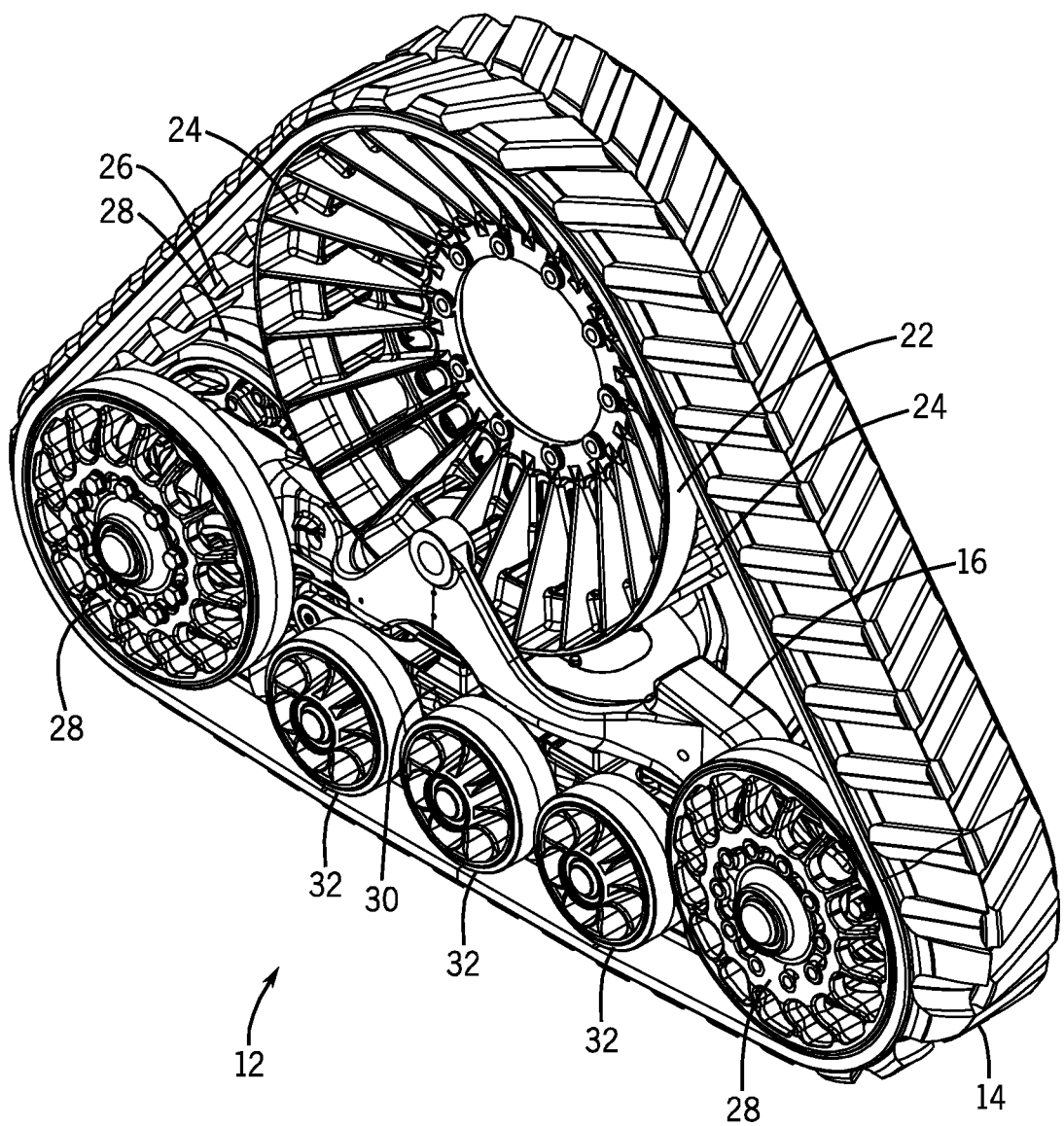
FIG. 2 is a perspective view of an embodiment of a suspension system that may be employed within the tracked work vehicle of FIG. 1.

FIG. 2 is a perspective view of an embodiment of the suspension system 12. The suspension system 12 includes a drive wheel 22 having multiple drive spokes 24 extending from its center to the perimeter of the drive wheel 22. Additionally, the continuous track 14 has multiple track protrusions 26 disposed along the length of the continuous track 14. Moreover, the drive wheel 22 is drivably coupled to the engine of the vehicle 10 so that the engine operation of the engine may turn the drive wheel 22 through a drive train, transmission, and/or another suitable drive system. The drive spokes 24 rotate about the circumference of the drive wheel 22 when the drive wheel 22 rotates. When rotating about the drive wheel 22, a drive spoke 24 engages a respective track protrusion 26 such that the rotation of the drive wheel 22 in one direction propels the continuous track 14 in the same direction.

The illustrated suspension system 12 further includes four idler wheels 28. As discussed below, the idler wheels 28 provide tension to the continuous track 14 to maintain contact between the track protrusions 26 and the respective drive spokes 24. Furthermore, by spacing the idler wheels 28 at a distance relatively close to the width of the track protrusions 28, the idler wheels 28 provide guidance to the continuous track 12 to block the continuous track 12 from laterally rotating away from the suspension system 12. Furthermore, although the illustrated track suspension 12 includes four idler wheels 22, other embodiments may include 2, 3, 4, 5, 6, or more idler wheels 28.

As discussed below, a roller wheel beam 30 supports the suspension system 12 by coupling with the undercarriage beam 16. The roller wheel beam 30 also couples with multiple roller wheels 32 arranged in two rows that are arranged at a distance that is at least the width of the roller wheel beam 30 and width of the protrusions. The roller wheels 32 provide support to the suspension system and roll along the continuous track 14 when the continuous track 14 is propelled around the suspension system 12 by the drive wheel 22. As can be appreciated, it is desirable to distribute the weight among the roller wheels 32 or else risk damage to the continuous track 12 and/or suspension system 12. For example, if one row of the roller wheels 32 receives an excessive portion of the vehicle load, the continuous track 14 may overheat where the continuous track 14 engages the respective row of roller wheels 32, thereby potentially causing damage to and/or lateral rotation of the continuous track 14. As illustrated, certain embodiments of the suspension system 12 may include 6 roller wheels 32 arranged in two rows. Other embodiments of the suspension system 12 may include 2, 4, 6, 8, or more roller wheels arranged in rows.

Since a width of the roller wheel beam 30 is restricted by a distance between the roller wheels 32 and the distance between the roller wheels 32 is restricted by the width of the continuous track 14, the width of the roller wheel beam 30 is ultimately restricted by the width of the continuous track 14. Similarly, a width of the undercarriage beam 16 is ultimately restricted by the width of continuous track 14 through its restriction of the distance between the idler wheels 28. In some embodiments, a narrow continuous track 14 is desirable, as previously discussed, but a narrow width of the continuous track 14 would at least partially restrict the width of the undercarriage beam 16 and roller wheel beam 30. Accordingly, in such embodiments, it is desirable to have a narrow undercarriage beam 16 and roller wheel beam 30.

Figure 3:
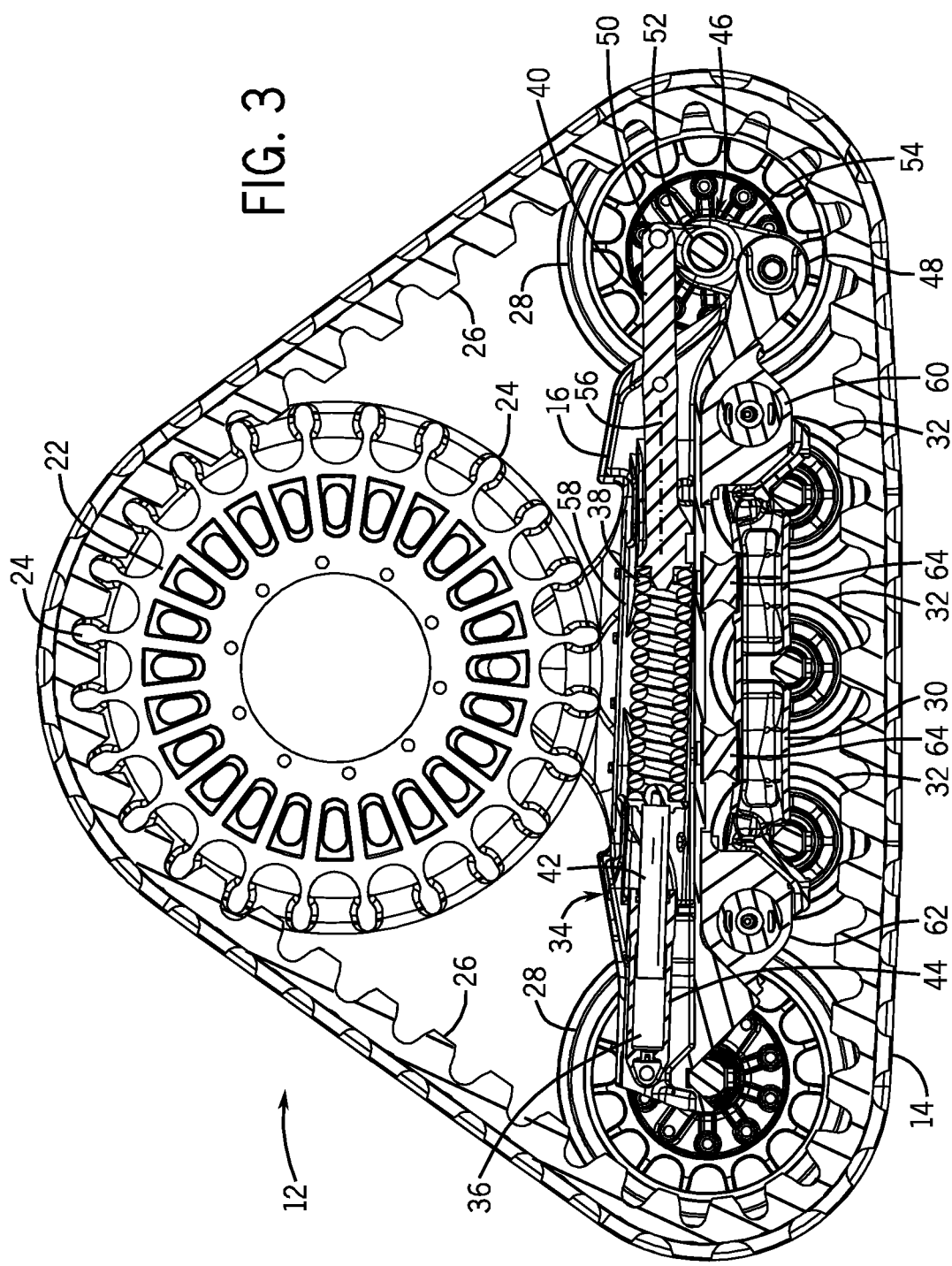
FIG. 3 is a cross-sectional view of the suspension system shown in FIG. 2.

FIG. 3 is a cross-section of an embodiment of the suspension system 12. As illustrated, the suspension system 12 includes a tensioning system 34 disposed within the undercarriage beam 16. The tensioning system 34 includes an actuator 36, overload protection system 38, and an extension arm 40. The actuator 36 includes a piston 42 and an actuator body 44. The extension arm 40 couples to a pivot assembly 46. The pivot assembly 46 includes a static pivot joint 48 and an extendable pivot joint 50 each coupled to an idler wheel axle 52 via a pivot plate 54. As discussed below, each pivot joint enables the idler wheel axle 52 to move in a substantially horizontal direction according to the movement of the extension arm 40 along a longitudinal axis 56 of the extension arm 40. Furthermore, the suspension system 12 includes a protection plate 58 coupled to the undercarriage beam to protect the tensioning system 34 from dirt and other contaminants that may otherwise obstruct the operation of the actuator 36, the overload protection system 38, or the extension arm 40.

In certain embodiments, the actuator may be a hydraulic cylinder. In such embodiments, the actuator body 44 may be filled with a hydraulic fluid, thereby extending the piston 42 out of the actuator body 44. When the piston 42 extends, it pushes against the overload protection system 38. In the illustrated embodiment, the overload protection system 38 is a coil spring configured to prevent overload of the actuator 36, but other embodiments may include other suitable overload protection systems, such as a hydraulic accumulators using raised weight, compressed gas, or metal bellows. Tension in the overload protection system 38 exerts pressure against the extension arm 40 thereby extending the arm 40 away from the actuator 36. As the extension arm 40 extends in the longitudinal direction 56, the extendable pivot joint 52 moves in the same direction, thereby enabling the idler wheel axle 52 to move in the same direction. As can be appreciated, by extending the extension arm 40 at a desired pressure, the continuous track 14 may be loaded with a desired tension to block lateral rotation of the continuous track 14 during operation of the vehicle 10.

Additionally, suspension system 12 includes a front bushing mount 60 and a rear bushing mount 62 used to couple the roller wheel beam 30 to the undercarriage beam 16, as discussed below. Further, the suspension system 12 includes multiple vertical mounts 64. The vertical mounts 64 enable the undercarriage beam 16 to support a vertical load (e.g., weight of the vehicle 10) and to absorb vertical movement of the roller wheel beam 30 during operation of the vehicle 10. Additionally, the illustrated embodiment of the suspension system 12 includes two vertical mounts, but other embodiments may include 0, 1, 2, 3, or more vertical mounts.

Figure 4:
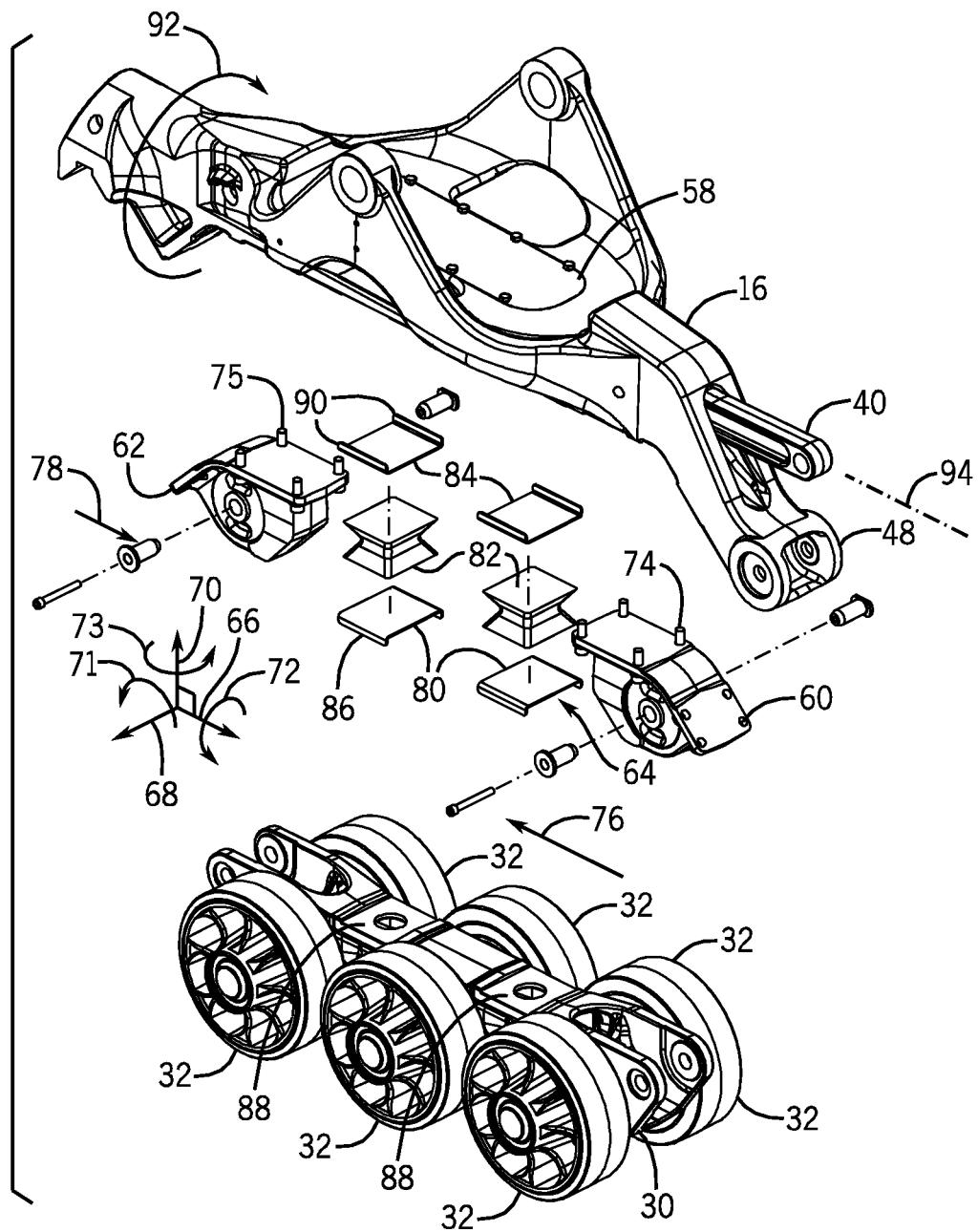
FIG. 4 is a partially exploded perspective view of the suspension system shown in FIG. 2.

FIG. 4 is a partially exploded view of the suspension system 12. Specifically, the undercarriage beam 16, roller wheel beam 30, front bushing mount 60, rear bushing mount 62, and vertical mounts 64 are shown. For the purposes of discussion reference may be made to a longitudinal direction 66, an axial direction 68, and a vertical direction 70 with respect to the roller wheel beam 30 and undercarriage beam 16. Reference may also be made to a pitch direction 71, a roll direction 72, and a yaw direction 73 for the suspension system 12.

In certain embodiments, the front bushing mount 60 is coupled to the undercarriage beam 16 via front mount bolts 74 and is also coupled to the roller wheel beam 30 via a front pin assembly 76, and the rear bushing mount 62 is coupled to the undercarriage beam 16 via rear mount bolts 75 and is also coupled to the roller wheel beam 30 via a rear pin assembly 78. Other embodiments may couple the front bushing mount and/or the rear bushing mount 62 to the undercarriage beam 16 using welding connection, brackets, braces, or other suitable connections. As discussed in detail below, the pin assemblies 76, 78 compactly couple the roller wheel beam 30 to a respective bushing mount 60, 62, thereby enabling a compact placement of the roller wheels 32. Moreover, the coupling between the bushing mounts 60, 62 and the roller wheel beam 30 damps movement of the roller wheel beam 30 in the roll direction 72 and limits movement of the roller wheel beam 30 in the roll direction 72 and the yaw direction 73.

Each vertical mount 64 includes a lower pad 80, a rubber pad 82, and an upper pad 84. In certain embodiments, the width of the lower pad 80 and the upper pad 84 in the axial direction 68 is equal to a width of the roller wheel beam 30 in the axial direction 68. In other embodiments, the width of the lower pad 80 and the upper pad 84 may be greater than or equal to the width of the roller wheel beam 30 in the axial direction 68. Moreover, the lower pad 80 has two lower flanges 86 that extend downwardly in the vertical direction 70 on opposite ends of each lower pad 80. The lower flanges 86 have a width in the longitudinal direction 66 that is less than or substantially equal to a width of a roller wheel beam notch 88 in the longitudinal direction 66. The roller wheel beam notch 88 is formed into the roller wheel beam 30 such that the notch 88 may receive the lower pad 80 until the lower pad 80 is planar with the lateral and upper faces of the roller wheel beam 30. In other words, the roller wheel beam notch 88 may be substantially the same size and shape as the lower pad 80.

As can be appreciated, the wheel beam notch 88 blocks the vertical mount 64 from moving in the longitudinal direction 66, and the lower flanges 86 block movement of the vertical mount 64 in the axial direction 68. Similar to the lower pad 80, the upper pad 84 has two upper flanges 90 located on opposite ends of the upper pad 84. The upper flanges 90 extend upwardly in the vertical direction 70 having a width in the longitudinal direction 66 that less than or substantially equal to the width of a notch in the undercarriage beam 16. The undercarriage beam notch secures the upper pad 84 relative to the undercarriage beam 16 to block movement of each respective vertical mount 64 in a manner similar to the roller wheel beam notch 88 securing the lower pad 80. The vertical mounts 64 also include a rubber pad 82. The rubber pad 82 provides support for the undercarriage beam 16 and enables the roller wheel beam 30 to move in the vertical direction 70 while damping the movement in the vertical direction 70 thereby reducing the movement transmitted to the undercarriage beam 16 and ultimately the remainder of the vehicle 10 (e.g. driver compartment).

Figure 5:
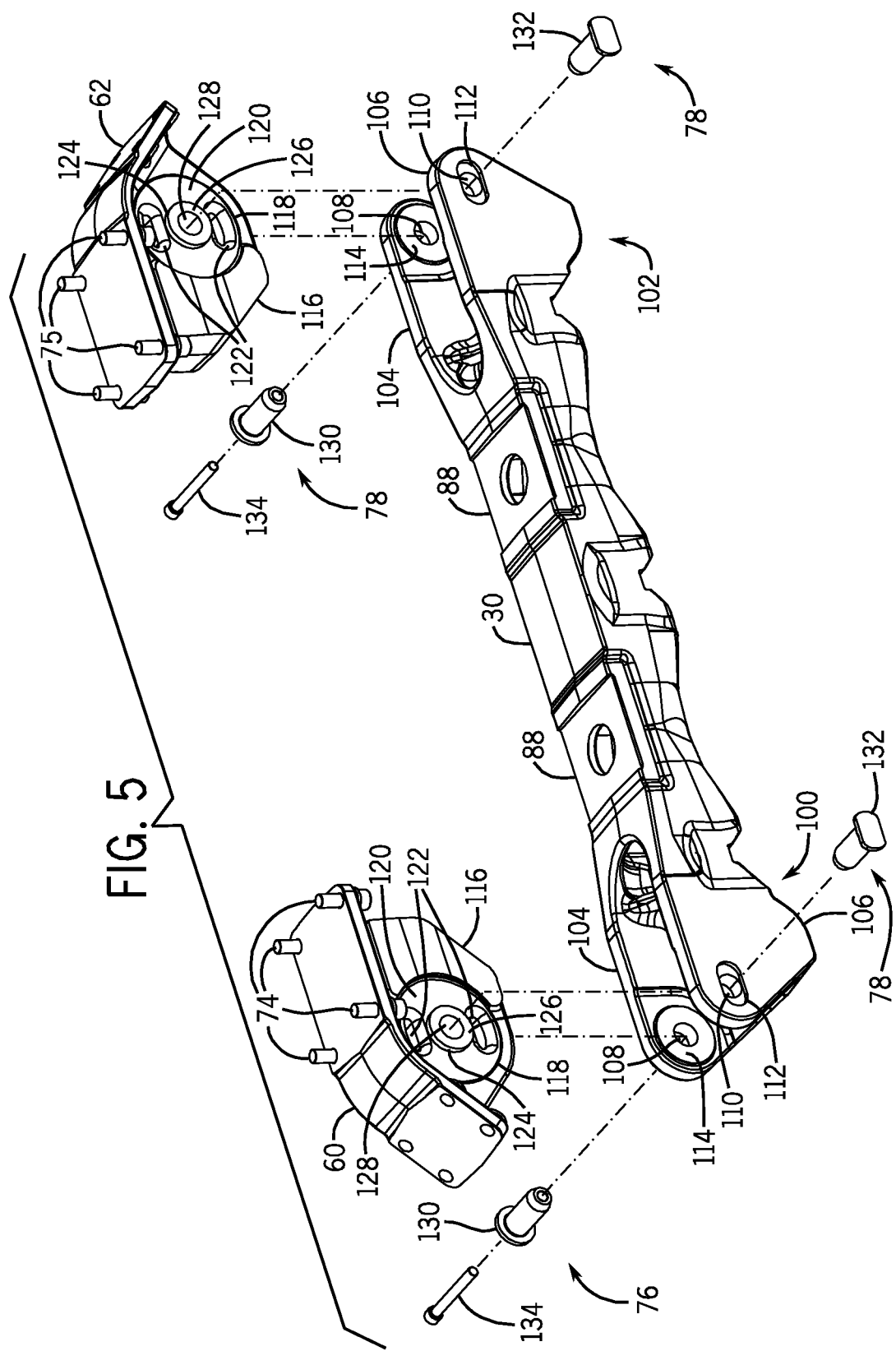
FIG. 5 is a partially exploded perspective view of an embodiment of a roller wheel beam that may be employed within the suspension system of FIG. 2.

FIG. 5 is a partially exploded perspective view of the roller wheel beam 30, front bushing mount 60, and rear bushing mount 62 of the suspension system 12. The roller wheel beam 30 has a front clevis 100 and a rear clevis 102. Each clevis has a first arm 104 and a second arm 106. The first arm 104 has a first opening 108, and the second arm has a second opening 110. In certain embodiments, the first opening 108 and/or the second opening 110 may have an annular shape, a polygonal shape, a combination thereof, or any other suitable shape. Additionally, in some embodiments, the openings may vary in size relative to one another. The first arm 104 also includes a first recess that is located on an exterior face of the roller wheel beam 30 and concentric with the first opening 108. In some embodiments, the first recess may be cylindrical, polyhedral, or another shape (e.g., obround). Similarly, the second arm 106 includes a second recess 112 located on an exterior face of the roller wheel beam 30 and concentric with the second opening 110. The illustrated embodiment of the second recess 112 is obround, but other embodiments of the second recess 112 may be cylindrical, polyhedral, or another shape. In certain embodiments, it may be desirable to form the second opening 110 and/or the second recess 112 into a shape that blocks rotation of a pin within the second opening 110. Moreover, each arm 104, 106 may include a machined section 114 on an inner surface of the arm about a respective opening 108, 110 to enable rotation of a bushing in contact with the arms.

The illustrated embodiment of the suspension system 12 further includes the front bushing mount 60 and the rear bushing mount 62. Each bushing mount 60, 62 includes a frame 116 formed from a rigid material (e.g., steel, ductile iron, etc.) suitable for mounting the bushing mount 60, 62 to the undercarriage beam 16. In certain embodiments, the frame 116 may provide additional support to the undercarriage beam 16, and may be coupled to the undercarriage beam using front and rear mount bolts 74, 75. In other embodiments, the rigid frame 116 may be coupled to the undercarriage beam 16 by brackets, braces, welded connections, or another suitable coupling. Furthermore, the rigid frame 116 includes a frame opening 118 that extends through the rigid frame 116. In certain embodiments, the frame opening 118 may have a cylindrical or annular shape. However, other embodiments may include frame openings 118 having a polyhedral shape. Moreover, each bushing mount 60, 62 includes a bushing 120 disposed within the frame opening 118. In some embodiments, the bushing 120 may be formed from rubber or other resilient materials suitable for compression within the frame opening 118. Additionally, the shape of the bushing 120 may be selected to correspond to the frame opening 118.

Each bushing 120 may include one or more cutouts 122. The number, size, location, and shape of the cutouts 122 may be selected to achieve a desired resistance to compression in each direction. For example, to enable more compression of the bushing 120, the bushing 120 may include additional cutouts 122 or cutouts having an increased size. Alternatively, the bushing 120 may include fewer cutouts 122, and/or smaller cutouts 122 to reduce the compressibility of the bushing 122. Accordingly, various embodiments of the bushing 122 may include 0, 1, 2, 3, 4, or more cutouts 122 with various locations, sizes, and shapes selected according to the desired compressibility of the bushing 120. Furthermore, each bushing 120 includes a bushing opening 124 that extends through the bushing 120. An interior bushing 126 is located within the bushing opening 124. The interior bushing 126 may be formed from steel, iron, or another suitable rigid material. In some embodiments, the interior bushing 126 may be bonded to the bushing 122 (e.g., using an adhesive or a material connection). Additionally, the interior bushing 126 may extend beyond the bushing 120 on either lateral side of the bushing opening 124, thereby enabling rotation of the interior bushing 126 even when the interior bushing 126 abuts the machined portion 114. The interior bushing 126 includes an interior bushing opening 128 that extends through the interior bushing 126. Additionally, the interior bushing 126 may have an annular cross-section, a rectangular cross-section, or any cylindrical/polyhedral cross-section having an interior bushing opening 128. Moreover, the bushing opening 124 may be any shape corresponding to the shape of the interior bushing 126 so that the wall of the interior bushing 126 engages the wall of the bushing opening 124.

The suspension system 12 further includes pin assemblies 76, 78 that are each configured for insertion into a respective opening within a respective bushing mount 60, 62. Each pin assembly 76, 78 includes a first pin 130, a second pin 132, and a pin bolt 134. As discussed in detail below, the first pin 130 is inserted through the first opening 108 and into the interior bushing opening 128 (or the bushing opening 124 if an embodiment of the suspension system 12 does not include the interior bushing 126). Furthermore, the second pin 132 is inserted through the second opening 110 and into the interior bushing opening 128 (or the bushing opening 124 if the interior bushing 126 is omitted from an embodiment).

Figure 6:
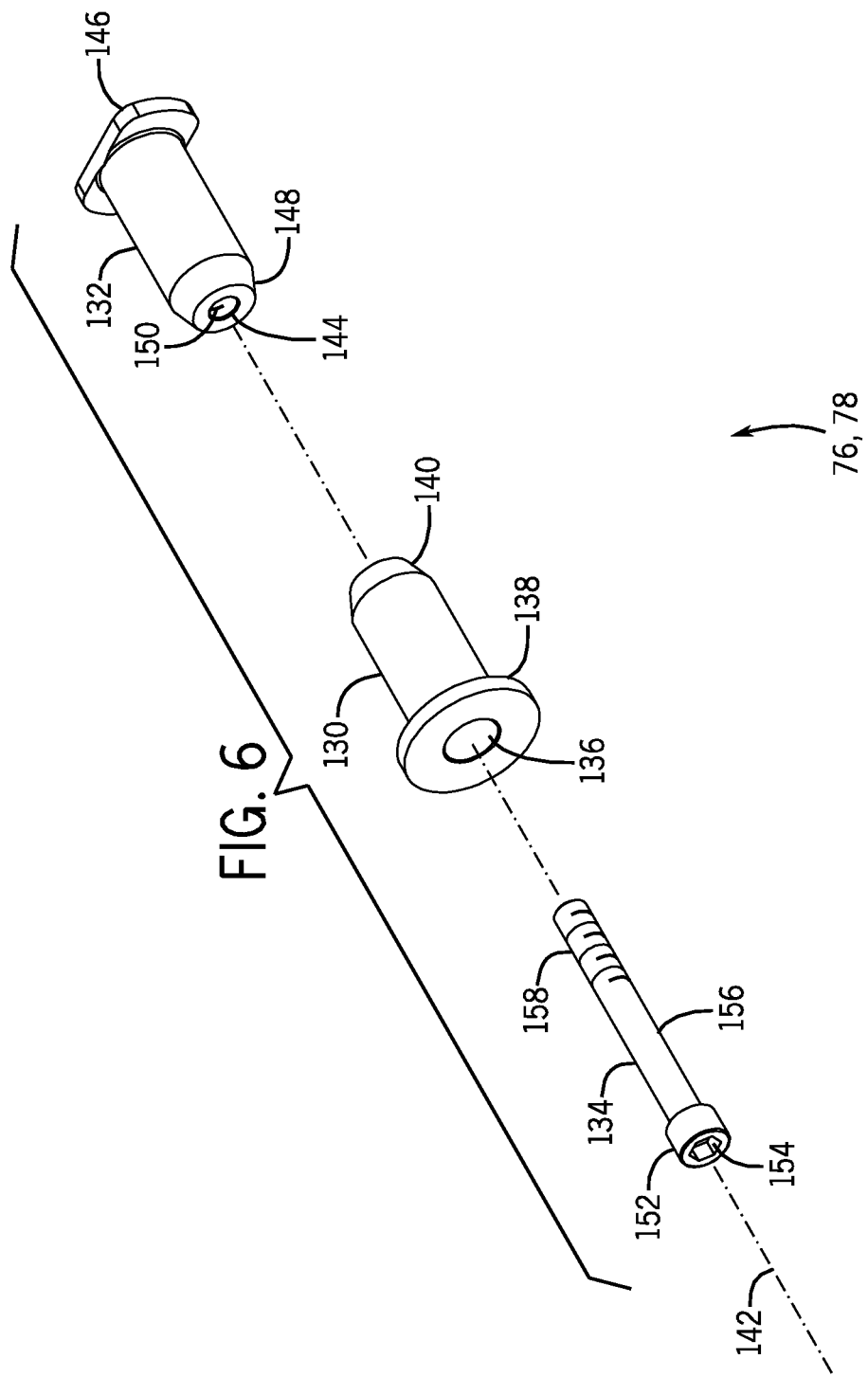
FIG. 6 is an exploded perspective view of an embodiment of a pin assembly that may be employed within the suspension system of FIG. 2.

As illustrated in FIG. 6, the first pin 130 includes a first annular opening 136, a first pin head 138, and a first chamfered end 140. Furthermore, the first annular opening 136 extends through the entire first pin 130 along a longitudinal axis 142 of the pin assembly 76, 78. The second pin 132 has a second annular opening 144 along the longitudinal axis 142, a second pin head 146, and a second chamfered end 148. The second annular opening 144 extends into the second pin 132 and has a threaded portion 150. In some embodiments, the second annular opening 144 extends through the entire second pin 132 and the head 146. In other embodiments, the second annular opening 144 only extends through a portion of the second pin 132. Additionally, certain embodiments may include a threaded portion 150 that extends along the entire length of the second annular opening 144, but other embodiments may include a threaded portion 150 that only extends along a portion of the second annular opening 144.

As will be appreciated, because the bushing 120 is composed of a resilient material, the bushing 120 may rotate within the frame opening 118, thereby skewing alignment of the interior bushing opening 128 with the first opening 108 and the second opening 110. To facilitate the alignment of the interior bushing opening 128 with the first opening 108 and the second opening 110, each pin has a chamfered end configured to facilitate insertion of the pin into the interior bushing opening 128. Specifically, the first pin 130 has a first chamfered end 140 that enables the first pin 130 to be inserted into the first opening 108 and a first end of the interior bushing opening 128. Similarly, the second pin 132 has a second chamfered end 148 that enables the second pin 132 to be inserted into the second opening 110 and a second end of the interior bushing opening 128. As will be appreciated, by inserting both pins 130, 132 into respective openings (e.g., the first opening 108) using a chamfered end (e.g., first chamfered end 140), the pins facilitate further alignment of the interior bushing opening 128 with each respective opening 108, 110. Furthermore, in certain embodiments, the first pin 130 and the second pin 132 may contact each other within the interior bushing opening 128. Other embodiments may include a gap between the first pin 130 and the second pin 132 when the pins are inserted into the interior bushing opening 128.

Additionally, each pin 130, 132 includes a pin head 138, 146 that fits into the respective recess on the roller wheel beam 30 such that each pin head does not extend beyond the exterior surface of the roller wheel beam 30. For example, the first pin head 138 is fully inserted into the first recess in the roller wheel beam 30 such that the first pin head 146 does not extend out from the first recess when the first pin 130 is inserted into the first opening 108. Similarly, the second pin head 138 is fully inserted into the second recess 112 such that the second pin head 146 does not extend out from the second recess 112 when the second pin 132 is inserted into the second opening 112. In other words, the pins 130, 132 do not increase the width of the roller wheel beam 30 when inserted into their respective openings.

To enable the insertion of each pin head into the respective recess, each pin head may be formed into a shape that corresponds to the shape of the respective recesses. Accordingly, the pin heads 138, 146 may be formed into any polyhedral shape, cylindrical shape, or any other suitable shape. For example, the illustrated embodiment of the pin assembly 76, 78 include an obround-shaped second pin head 146 that may be inserted into the similarly obround-shaped second recess 112. Similarly,—the cylindrical shaped first pin head 138 may be inserted into a similarly shaped first recess. In some embodiments, the pin heads 138, 148 may have a depth that is equal to or less than the depth of the respective recess. In other words, each pin head may be planar with a respective laterally outward surface of the roller wheel beam 30, or may be recessed within the laterally outwards surface of the roller wheel beam 30. As may be appreciated, having each pin 130, 132 recessed in or planar with the sides of the roller wheel beam, the pins may not interfere with operation of the roller wheels 32 when the pins are fully inserted into the roller wheel beam 30. In addition, the pins do not extend the width of the roller wheel beam 30 and/or the continuous track 14.

The bolt 134 includes a bolt head 152 having a driving section 154. In certain embodiments, the driving section 154 includes a hexagonal shaped recess suitable for driving the bolt 134 in rotation. However, other embodiments may include other suitable arrangements of driving the bolt 134 (e.g., Phillips type drive). Further, a radius of the bolt head 152 is smaller or equal to a radius of the first annular opening 136. By limiting the diameter of the bolt head 152 to the diameter of the first annular opening 136, the bolt 134 may be fully inserted into the first pin 130, thereby substantially reducing or eliminating the possibility of interference with operation of the roller wheels 32. The bolt 134 further includes a shaft 156 having multiple threads 158. In some embodiments, the threads 158 may extend along the full length of the shaft 156. In other embodiments, the threads 158 may extend only a portion of the length of the shaft 156. The threads 158 correspond to the threaded portion 150 of the opening 144 such that the threaded portion 150 engages the threads 158 when the bolt 134 is inserted into the second pin 132. Specifically, after the first pin 130 is inserted into the first opening 108 and the second pin 132 is inserted into the second opening 110, the bolt 134 may be inserted through the first annular opening 136 and into the second annular opening 144 such that the threads 158 engage the threaded portion 150. Accordingly, the bolt 134 secures the first pin 130 and the second pin 132 thereby securing the bushing mount to the roller wheel beam 30.

Figure 7:
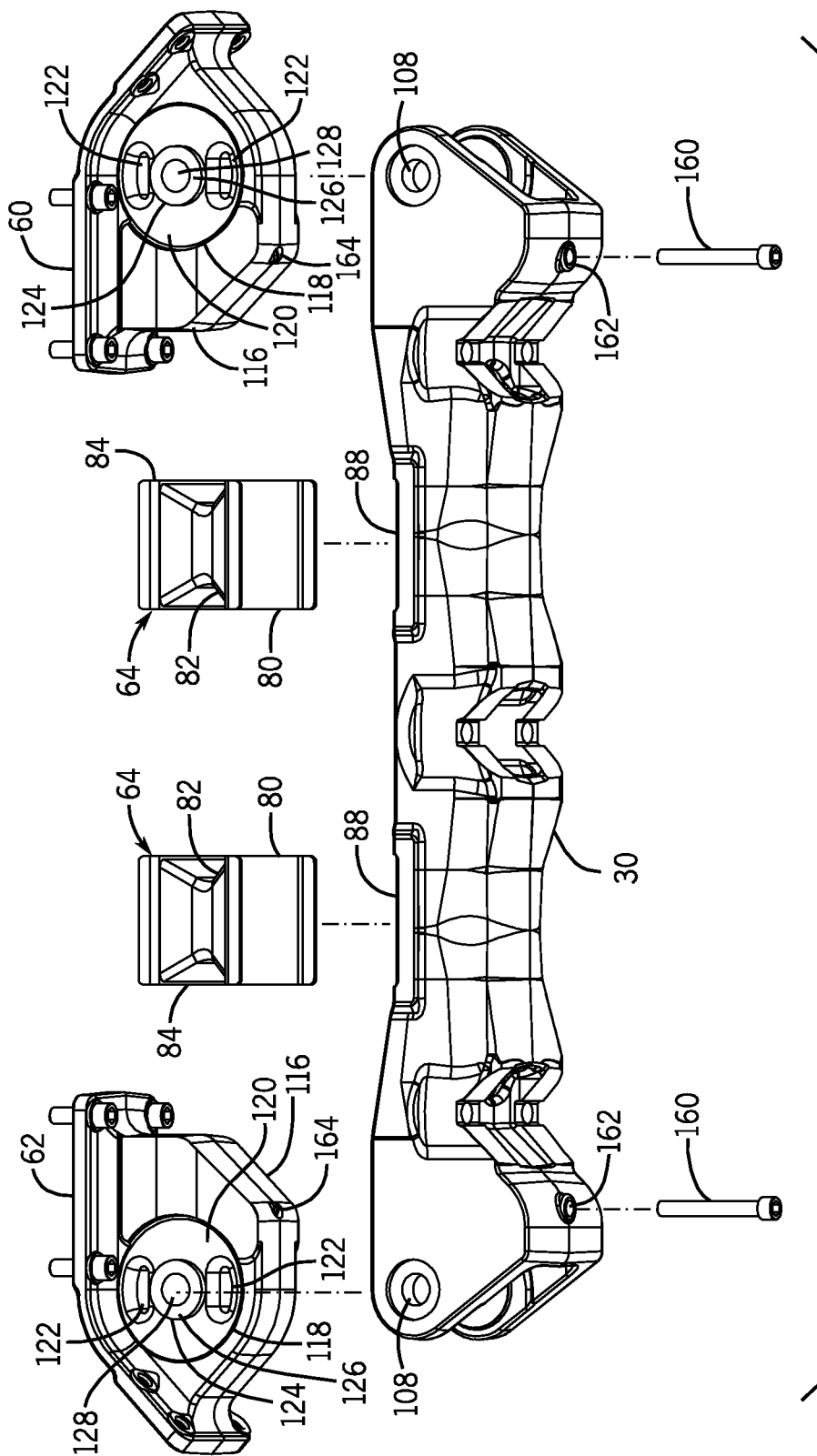
FIG. 7 is a partially exploded perspective view of the roller wheel beam and bushing mount of FIG. 5.

FIG. 7 is a partially exploded perspective view of the roller wheel beam 30 and the bushing mounts 60, 62, illustrating an embodiment of a compression bolt 160. As will be appreciated, the vertical mounts 64 may interfere with the vertical alignment of the interior bushing openings 128 and the first and second openings 108, 110 because to the height of the uncompressed vertical mount 64 is greater than the desired final distance between the roller wheel beam 30 and the undercarriage beam 16. However, the resilient pad 82 may be compressed to facilitate vertical alignment of the interior bushing opening 128 with the first and second openings 108, 110. In the illustrated embodiment, the roller wheel beam 30 includes a compression slot 162. The compression slot 162 may be aligned with a bolt receiver 164 in the rigid frame 116, which has threads configured to engage corresponding threads on the compression bolt 160. When each bushing mount 60, 62 is properly aligned with the roller wheel beam 30, the compression bolt 160 may be inserted through the compression slot 162 and into the bolt receiver 164. As the compression bolt 160 is rotated, the roller wheel beam 30 is driven closer to the undercarriage beam 16, thereby compressing the vertical mounts 64. After the compression bolt 160 is rotated to substantially align the interior bushing opening 128 with the first opening 108 and the second opening 110, the pins may be inserted into the respective openings Furthermore, in some embodiments, after the pins 130, 132 are inserted through respective openings and secured using the bolt 134, the compression bolts 160 may be removed.

FIG. 8 is a partially exploded perspective view of a bushing mount 60, 62 including a roll angle limiting system 200. As the roller wheel beam 30 rotates in the roll direction 72, the first arm 104, the second arm 106, and the pin assemblies 76, 78 are urged to rotate in the same roll direction 72. The bushing mount 60, 62 resists the rotation by compressing at least some portion of the bushing 120. As previously discussed, the cutouts 122 may be particularly selected to achieve a desirable amount of compression resistance. For example, if a higher compression resistance is desired the size and/or number of cutouts 122 may be reduced. Furthermore, if a lower level of compression resistance is desired, the size and/or number of cutouts 122 may be increased. Additionally or alternatively, the material used to form the bushing 120 (e.g., rubber) may be selected to achieve a desired compressibility.

Moreover, a roll limiting system 200 may be included to limit the roll angle of the roller wheel beam 30 in relation to the undercarriage beam 16 and/or bushing mounts 60, 62. Specifically, the roll angle limiting system 200 includes an upper angular portion 202, vertical section 204, and a lower angular portion 206. These portions may be located on both lateral sides of each bushing mount 60, 62. In certain embodiments, the upper angular portion 202 and/or lower angular portion 204 may be formed by machining the bushing frame 116 to establish substantially flat and angularly accurate surfaces. Each angular portion is configured to block roll of the roller wheel beam 30 via contact between the angular portion and an inner surface of a respective clevis arm. For example, the first arm 104 may rotate in the roll direction 72 until the first arm 104 engages the upper angular portion 202. When the arm engages an angular portion, the resulting contact blocks rotation of the roller wheel beam 30 in the roll direction 72. In addition, the roll limiting system 200 enables rotation of the roller wheel beam 30 in the roll direction 72 due to a gap created between each angular portion and the respective clevis arm, thereby facilitating rotation in the roll direction 72 until the roller wheel beam 30 reaches a threshold angle. Additionally, in certain embodiments, the roll limiting system 200 may include threshold angles of 1, 2, 3, 4, 5, 6, 7, 8, or more degrees. In some embodiments, the upper angular portion 202 and the lower angular portion 206 may establish the same threshold angle (e.g., less than 6 degrees). Other embodiments may include an upper angular portion 202 and a lower angular portion 206 configured to establish different threshold angles (e.g., upper angle of 5 degrees and a lower angle of 6 degrees) to facilitate asymmetrical rotation of the roller wheel beam. Alternatively, embodiments having differing threshold angles may accommodate roller wheel beams that have shapes other than a rectangular solid.

Furthermore, the roll limiting system 200 may block rotation of the roller wheel beam 30 in the yaw direction 73. Specifically, as the roller wheel beam 30 is urged to rotate in the yaw direction 73, the roller wheel beam 30 is blocked by contact between the middle section 204 and the first arm 104 or the second arm 106. In some embodiments, the bushing mounts may be configured to enable the roller wheel beam to rotate in the yaw direction 73 until a yaw threshold angle is reached. In certain embodiments, the yaw threshold angle may be 0, 0.25, 0.5, 0.75, 1, 1.25, 1.5, or more degrees. As will be appreciated, the yaw threshold angle may be altered by modifying a width of the bushing mount 60, 62 at the middle section 204. For example, the yaw threshold angle may be increased by decreasing the width of the bushing mount 60, 62 at the middle section 204.

As will be appreciated, by locating the pin assemblies 74, 76 and bushing mounts 60, 62 between the roller wheels 30, the suspension system 12 enables roll angle dampening and limitation without adding additional width to the suspension system 12 and the continuous track 14. Additionally, the vertical mounts 64 enable the suspension system 12 to damp movement in the vertical direction 70 (e.g., movement in the pitch direction 71), and enable the suspension system 12 to support vertical loads. Moreover, the vertical mounts 64 enable the suspension system 12 to damp vertical movement, and to support vertical loads without adding additional width to the suspension system 12 and the continuous track 14. Accordingly, a work vehicle 10 incorporating the disclosed suspension system 12 enables the work vehicle 10 to be used in narrower locations, among crops arranged in narrower rows, and/or in applications where reduced soil compaction is desired. Furthermore, a work vehicle incorporating the disclosed suspension system 12 enables the work vehicle 10 to allow for a smoother ride and enhanced track longevity.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.)) without materially departing from the novel teachings and advantages of the subject matter recited in the claims. It is, therefore, to be understood that the appended claims are intended to cover all such modifications and changes as fall within the true spirit of the disclosure. Furthermore, in an effort to provide a concise description of the embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A suspension system, for a tracked work vehicle, comprising:
    an undercarriage beam;
    a roller wheel assembly comprising a roller wheel beam having a front clevis and a rear clevis, and a plurality of roller wheels rotatably coupled to the roller wheel beam;
    a front bushing mount coupled to the front clevis, and a rear bushing mount coupled to the rear clevis, wherein the front bushing mount and the rear bushing mount are rigidly coupled to the undercarriage beam, and configured to damp roll of the roller wheel beam relative to the undercarriage beam, each bushing mount comprising a bushing frame having a bore, and a resilient bushing disposed within the bore, the bushing frame rigidly coupled to the undercarriage beam, and the resilient bushing resiliently coupled to a respective clevis; and
    at least one vertical mount disposed between the roller wheel beam and the undercarriage beam, the at least one vertical mount comprising:
        a first pad configured to engage a first notch in the undercarriage beam, wherein the first pad comprises two first flanges that extend upwardly and are located at opposing lateral ends of the first pad;
        a second pad configured to engage a second notch in the roller wheel beam, wherein the second pad comprises two second flanges that extend downwardly and are located at opposing lateral ends of the second pad; and
        a resilient pad disposed between the first and second pads, wherein the resilient pad is configured to damp vertical movement of the roller wheel beam relative to the undercarriage beam,
    wherein the at least one vertical mount is configured to provide vertical support for the roller wheel beam, and to damp vertical movement of the roller wheel beam relative to the undercarriage beam.

2. The suspension system of claim 1, wherein the first flanges engage opposing lateral faces of the undercarriage beam to orient the vertical mount in relation to the undercarriage beam, and the second flanges engage opposing lateral faces of the roller wheel beam to orient the vertical mount in relation to the roller wheel beam.

3. The suspension system of claim 1, wherein the bushing frame comprises:
    a first face in facing relation with an inner surface of a first arm of a respective clevis, wherein the first face comprises:
        a first upper angular portion angled away from the inner surface of the first arm at a threshold angle;
        a first middle portion oriented substantially parallel to the inner surface of the first arm; and
        a first lower angular portion angled away from the inner surface of the first arm at the threshold angle;
    a second face in facing relation with an inner surface of a second arm of the respective clevis, wherein the second face comprises:

a second upper angular portion angled away from the inner surface of the second arm at the threshold angle;

a second middle portion oriented substantially parallel to the inner surface of the second arm; and a second lower angular portion angled away from the inner surface of the second arm at the threshold angle.

4. The suspension system of claim 3, wherein the bushing frame is configured to block roll of the roller wheel beam beyond the threshold angle, via contact between the angular portions and the respective inner surfaces.

5. The suspension system of claim 4, wherein the threshold angle is less than 6 degrees.

6. The suspension system of claim 3, wherein the first middle portion is configured to engage the inner surface of the first arm, and the second middle portion is configured to engage the inner surface of the second arm to substantially block yaw of the roller wheel beam relative to the undercarriage beam.

7. A suspension system for a work vehicle, comprising:
a roller wheel beam comprising a clevis, wherein the clevis includes a first arm and a second arm;
a bushing mount resiliently coupled to the clevis between the first arm and the second arm, wherein the bushing mount comprises:
a bushing frame having a bore and at least one face configured to block rotation of the roller wheel beam beyond a threshold angle via contact between the at least one face and an inner surface of a respective arm of the clevis;
a resilient bushing disposed within the bore, and configured to damp roll of the roller wheel beam via compression of the resilient bushing; and
at least one vertical mount disposed between the roller wheel beam and an undercarriage beam, the at least one vertical mount comprising:
a first pad configured to engage a first notch in an undercarriage beam, wherein the first pad comprises two first flanges that extend upwardly and are located at opposing lateral ends of the first pad;
a second pad configured to engage a second notch in the roller wheel beam, wherein the second pad comprises two second flanges that extend downwardly and are located at opposing lateral ends of the second pad; and a resilient pad disposed between the first and second pads, wherein the resilient pad is configured to damp vertical movement of the roller wheel beam relative to the undercarriage beam, wherein the at least one vertical mount is configured to support the undercarriage beam, and to damp vertical movement of the roller wheel beam relative to the undercarriage beam.

8. The suspension system of claim 7, comprising a pin assembly configured to resiliently couple the bushing mount to the clevis.

9. The suspension system of claim 7, wherein the bushing frame comprises:
a first face in facing relation with an inner surface of the first arm, wherein the first face comprises:
a first upper angular portion angled away from the inner surface of the first arm at a threshold angle;
a first middle portion oriented substantially parallel to the inner surface of the first arm; and
a first lower angular portion angled away from the inner surface of the first arm at the threshold angle;
a second face in facing relation with an inner surface of the second arm, wherein the second face comprises:
a second upper angular portion angled away from the inner surface of the second arm at the threshold angle;
a second middle portion oriented substantially parallel to the inner surface of the second arm; and
a second lower angular portion angled away from the inner surface of the second arm at the threshold angle.

10. The suspension system of claim 9, wherein the threshold angle is less than 6 degrees.

11. The suspension system of claim 9, wherein the first middle portion is configured to engage the inner surface of the first arm, and the second middle portion is configured to engage the inner surface of the second arm to substantially block yaw of the roller wheel beam relative to the undercarriage beam.

12. The suspension system of claim 7, wherein the resilient bushing comprises a plurality of cutouts configured to vary a compressibility of the resilient bushing.

13. The suspension system of claim 7, wherein the bushing frame is formed from a material comprising ductile iron.

* * * * *